(12) United States Patent
Chen et al.

(10) Patent No.: US 10,748,053 B2
(45) Date of Patent: Aug. 18, 2020

(54) TICKET AUTHENTICATION METHOD AND TICKET AUTHENTICATION DEVICE

(71) Applicant: INDUSTRIAL TECHNOLOGY RESEARCH INSTITUTE, Hsinchu (TW)

(72) Inventors: Yi-Yuan Chen, Taoyuan (TW); Xin-Lan Liao, Taichung (TW); Kun-Hsien Lin, Taichung (TW); Lih-Guong Jang, Hsinchu (TW); Chi-Neng Liu, New Taipei (TW); Nien-Chu Wu, Taoyuan (TW); Po-Yu Huang, Douliu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 526 days.

(21) Appl. No.: 15/394,275

(22) Filed: Dec. 29, 2016

(65) Prior Publication Data
US 2018/0144233 A1 May 24, 2018

(30) Foreign Application Priority Data
Nov. 24, 2016 (TW) .............................. 105138728 A (51) Int. Cl.
*G06K 19/10* (2006.01)
*H04L 9/32* (2006.01)
(Continued)

(52) U.S. Cl.
CPC ....... *G06K 19/10* (2013.01); *G06K 19/06009* (2013.01); *G06Q 30/0185* (2013.01);
(Continued)

(58) Field of Classification Search
USPC ............................................. 380/51; 235/494
See application file for complete search history.

(56) References Cited

U.S. PATENT DOCUMENTS

| 6,033,648 A | 3/2000 | Candau |
| 6,223,166 B1 * | 4/2001 | Kay ....................... G06Q 10/02 380/51 |

(Continued)

FOREIGN PATENT DOCUMENTS

| CN | 1245053 A | 2/2000 |
| CN | 101211482 A | 7/2008 |

(Continued)

OTHER PUBLICATIONS

Taiwan Office Action dated Nov. 10, 2017 in application No. 105138728.
(Continued)

*Primary Examiner* — Saba Dagnew
(74) *Attorney, Agent, or Firm* — Maschoff Brennan (57) ABSTRACT

A ticket authentication method and a ticket authentication device are provided. The ticket authentication method includes the following steps. A first electronic device outputs an e-ticket. A second electronic device acquires the e-ticket. The second electronic device outputs a visible light verification code. The first electronic device acquires the visible light verification code and generates a composite code according to a certification data and the verification code. The second electronic device acquires the visible light composite code, and determines whether the composite code matches the certification data and the verification code. When the composite code matches the certification data and the verification code, the second electronic determines that the authentication of the e-ticket is successful.

23 Claims, 5 Drawing Sheets

(51) Int. Cl.

| | |
|---|---|
| *H04W 12/06* | (2009.01) |
| *H04L 29/06* | (2006.01) |
| *G06K 19/06* | (2006.01) |
| *G06Q 30/00* | (2012.01) |
| *H04L 9/14* | (2006.01) |
| *H04L 9/30* | (2006.01) |
| *G06K 7/10* | (2006.01) |
| *H04W 12/00* | (2009.01) |
| *G06Q 10/02* | (2012.01) |

(52) U.S. Cl.
CPC ............... *H04L 9/14* (2013.01); *H04L 9/30* (2013.01); *H04L 9/3213* (2013.01); *H04L 9/3226* (2013.01); *H04L 9/3234* (2013.01); *H04L 9/3247* (2013.01); *H04L 9/3263* (2013.01); *H04L 63/083* (2013.01); *H04L 63/0807* (2013.01); *H04L 63/0823* (2013.01); *H04W 12/06* (2013.01); *G06K 7/1095* (2013.01); *G06Q 10/02* (2013.01); *G06Q 2220/00* (2013.01); *H04L 63/101* (2013.01); *H04L 2463/121* (2013.01); *H04W 12/00522* (2019.01)

(56) References Cited

U.S. PATENT DOCUMENTS

| | | |
|---|---|---|
| 9,239,979 B1 | 1/2016 | McGill |
| 2007/0106892 A1 | 5/2007 | Engberg |
| 2009/0167489 A1 | 7/2009 | Nan et al. |
| 2011/0215162 A1* | 9/2011 | Challa ............... G06K 7/10 235/494 |
| 2013/0313314 A1 | 11/2013 | Jeng et al. |

FOREIGN PATENT DOCUMENTS

| | | |
|---|---|---|
| CN | 102710418 A | 10/2012 |
| CN | 103116846 A | 5/2013 |
| CN | 103400418 A | 11/2013 |
| CN | 103490812 A | 1/2014 |
| CN | 103870988 A | 3/2014 |
| CN | 103795471 A | 5/2014 |
| CN | 103812657 A | 5/2014 |
| CN | 103870988 A | 6/2014 |
| CN | 105405005 A | 3/2016 |
| CN | 105550862 A | 5/2016 |
| CN | 105574629 A | 5/2016 |
| TW | I271668 | 1/2007 |
| TW | I387266 | 7/2007 |
| TW | I375919 | 5/2008 |
| TW | I335546 | 6/2008 |
| TW | I437509 | 8/2009 |
| TW | M410932 | 12/2010 |
| TW | 201349144 A | 12/2013 |
| WO | 2014101496 | 7/2014 |

OTHER PUBLICATIONS

"VINCE: Exploiting Visible Light Sensing for Smartphone-based NFC Systems" 2015 IEEE Conference on Computer Communications (INFOCOM), p. 2722-2730, 2015.

"Employing Smartphones Xenon Flashlight for Mobile Payment" 2014 IEEE, p. 5, Feb. 2014.

"NECAS: Near Field Communication System for Smartphones Based on Visible Light" 2014 IEEE WCNC'14 Track 3 (Mobile and Wireless Networks), p. 2426-2431, 2014.

"SBVLC: Secure Barcode-based Visible Light Communication for Smartphones" 2014 IEEE Conference on Computer Communications, p. 2661-2669, 2014.

"Secure eTickets Based on QR-Codes with User-Encrypted Content" 2010 IEEE, p. 2, 2010.

"Smartphones for Payments and Withdrawals Utilizing Embedded LED Flashlight for High Speed Data Transmission" 2013 Fifth International Conference on Computational Intelligence, Communication Systems and Networks, p. 63-66, 2013.

Chinese Office Action issued in corresponding application No. 201710010436.2, dated Dec. 3, 2019.

* cited by examiner

TICKET AUTHENTICATION METHOD AND TICKET AUTHENTICATION DEVICE

CROSS-REFERENCE TO RELATED APPLICATIONS

This non-provisional application claims priority under 35 U.S.C. § 119(a) on Patent Application No(s). 105138728 filed in Taiwan, R.O.C. on 2016 Nov. 24, the entire contents of which are hereby incorporated by reference.

TECHNICAL FIELD

The disclosure relates to a ticket authentication method and a ticket authentication device.

BACKGROUND

Conventional e-ticket verification technologies usually use unidirectional transmission technologies. However, the use of the unidirectional transmission technologies may easily cause e-ticket theft based on image copy technologies, so the security mechanism still has loopholes.

Moreover, conventional verification systems usually use online verification technologies. However, online verification causes the increase of the network traffic of a certificate server. Also, the organizer of a mega event would like to prevent a certificate server from being requested by a great deal of people for the verification of e-tickets at the same time, additional hardware should be disposed. The disposition of additional hardware will increase the cost. Accordingly, the security and immediacy of verification decrease.

SUMMARY

According to one or more embodiments, the disclosure provides a ticket authentication method including the following steps: outputting an e-ticket by visible light communication by a first electronic device; acquiring the e-ticket by a second electronic device; outputting verification codes by visible light communication by the second electronic device; temporarily storing the verification codes, which are outputted by visible light communication, in the second electronic device; acquiring the visible light verification code to produce a composite code according to a certification data and the verification code, and outputting the composite code by converting the composite code to visible light composite code to be outputted by the first electronic device; by the second electronic device acquiring the visible light composite code to determining whether the composite code matches the certification data and the verification code; and by the second electronic device considering that authentication of the e-ticket is successful when the composite code matches the certification data and the verification code.

According to one or more embodiments, the disclosure provides a ticket authentication device applied to a user end, and the ticket authentication device includes: an output module for outputting an e-ticket by visible light communication; an acquiring module coupled to the output module, for acquiring a visible light verification code corresponding to a certification data to obtain a verification code from the visible light verification code; and a combining module coupled to the output module and the acquiring module, for producing a composite code according to the certification data and the verification code and outputting the composite code via the output module.

According to one or more embodiments, the disclosure provides a ticket authentication method applied to a user end, and the ticket authentication method includes the following steps: outputting an e-ticket by visible light communication; acquiring a visible light verification code corresponding to the certification data to obtain a verification code from the visible light verification code; and producing a composite code according to the certification data and the verification code and outputting the composite code by visible light communication.

According to one or more embodiments, the disclosure provides a ticket authentication device applied to a verification end, and the ticket authentication device includes: an output module for outputting a plurality of verification codes by visible light communication; a storage unit for temporarily storing the plurality of verification codes outputted by visible light communication; an acquiring module for acquiring an e-ticket and a visible light composite code that is produced according to a certification data and the verification code to obtain a composite code from the visible light composite code; and a verification module coupled to the output module and the acquiring module, for determining whether the composite code matches the certification data and the verification code, and the verification module determining that authentication of the e-ticket is successful when the composite code matches the certification data and the verification code.

According to one or more embodiments, the disclosure provides a ticket authentication method applied to a verification end, and the ticket authentication method includes the following steps: outputting a verification code by visible light communication; acquiring an e-ticket, a visible light composite code, and a certification data corresponding to the e-ticket; obtaining a composite code from the visible light composite code; determining whether the composite code matches the certification data and the verification code; and determining that authentication of the e-ticket is successful when the composite code matches the certification data and the verification code.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

In some embodiments of the disclosure, a system having devices communicating with each other by visible light communication is provided. Therefore, signal in one device is outputted as a visible light signal and therefore received by another device. However, the contents of the signal in the device and the contents of the corresponding visible light signal is substantially identical or matched.

Figure 1:
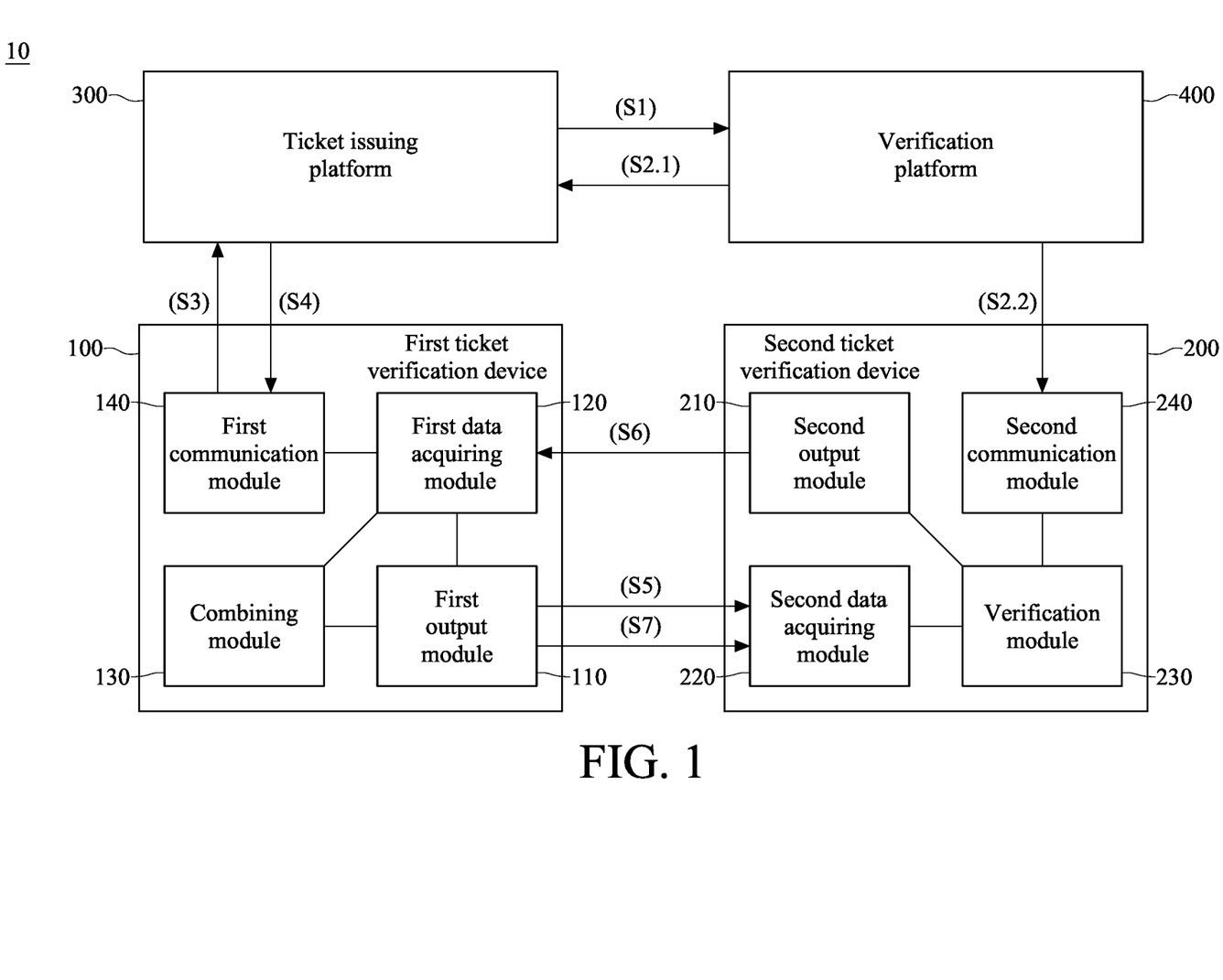
FIG. 1 is a schematic view of a ticket verification system in an embodiment of the disclosure.

FIG. 1 is a schematic view of a ticket verification system 10 in an embodiment of the disclosure. As shown in FIG. 1, the ticket verification system 10 includes a first ticket authentication device 100, a second ticket authentication device 200, a ticket issuing platform 300, and a verification platform 400. The first ticket authentication device 100 is applied to a user end. The second ticket authentication device 200 is applied to a verification end. For example, the first ticket authentication device 100 is not limited to be a smart phone, a tablet computer, or other electronic device held by a user. For example, the second ticket authentication device 200 is not limited to be a tablet computer, a laptop computer, a personal computer or an electronic device having a function of point of sales (POS), which is disposed in a write-off store.

The first ticket authentication device 100 includes a first output module 110, a first data acquiring module 120, a combining module 130, and a first communication module 140. The first data acquiring module 120 is coupled to the first output module 110, the combining module 130 is coupled to the first output module 110 and the first data acquiring module 120, and the first communication module 140 is coupled to the first data acquiring module 120. For example, the combining module 130 and the first communication module 140 are not limited to be microprocessors, ICs (also referred to as an integrated circuit, a chip, or a microchip), or other circuits or hardware having one or more relevant functional components.

The second ticket authentication device 200 includes a second output module 210, a second data acquiring module 220, a verification module 230, and a second communication module 240. The verification module 230 is coupled to the second data acquiring module 220 and the second output module 210, and the second communication module 240 is coupled to the verification module 230. For instances, the verification module 230 and the second communication module 240 are not limited to be microprocessors, ICs, or other circuits or hardware having one or more relevant functional components.

The first output module 110 is able to send one or more messages to the second data acquiring module 220, and the second output module 210 is able to send one or more messages to the first data acquiring module 120. For example, the first output module 110 is not limited to be a screen, the first data acquiring module 120 is not limited to be a photographing component, the second data output module 210 is not limited to be a light emitting component, and the second data acquiring module 220 is not limited to be a photographing component. However, the first output module 110, the first data acquiring module 120, the second output module 210 and the second data acquiring module 220 are not limited to be carried out by other transceivers or receiving and transmission circuits.

As shown in FIG. 1, the ticket issuing platform 300 is able to apply the verification platform 400 for an e-ticket (step S1). For example, the ticket issuing platform 300 applies the organizer of a specific food exposition for a ticket. After the verification platform 400 registers related e-ticketing information in response to the application for an e-ticket, the ticket issuing platform 300 obtains a corresponding e-ticket and a corresponding certification data (step S2.1). Moreover, in an embodiment of the disclosure, the second ticket authentication device 200 also obtains the certification data and a whitelisting of valid certification data (step S2.2).

Accordingly, a user can send a purchase request to the ticket issuing platform 300 via the first communication module 140 for the purchase of e-ticket (step S3). After the purchase of e-ticket is done, the first communication module 140 correspondingly receives the e-ticket and the certification data from the ticket issuing platform 300 (step S4).

When the user would like to enter the food exposition, the first ticket authentication device 100 of the user and the second ticket authentication device 200 of the write-off store can interact with each other by visible light communications (VLC) to implement the verification of e-ticket. However, other communication methods may be contemplated in the disclosure. Following is the detail description of the verification process of e-ticket. For instances, the visible light communications are not limited to include the techniques disclosed in Patent Nos. I387266 and I437509 filed in Taiwan, R.O.C. or the non-patent document "Near Field Communication System for Smartphones Based on Visible Light" NECAS 2014. All those having ordinary skill in the art can freely use other suitable visible light communications.

The first output module 110 outputs the e-ticket, and the second data acquiring module 220 acquires the e-ticket (step S5).

The second output module 210 outputs a visible light verification code, and the first data acquiring module 120 acquires the visible light verification code (step S6). The visible light verification code corresponds to the certification data.

In an embodiment, the combining module 130, according to the certification data and the verification code, produces a composite code. In an embodiment of the disclosure, the combining module 130 obtains an authentication secret key, which is indicated by a command of secret key authorized by an issuer of the verification code, among a plurality of secret keys, and then encodes a signature of verification end, the authentication secret key and the certification data to produce the composite code. Next, the first output module 110 outputs the composite code by visible light communication, and the second data acquiring module 220 acquires the visible light composite code (step S7). In another embodiment, the combining module 130 may utilize a data encryption standard (DES), a triple DES (3DES) algorithm, an advanced encryption standard (AES), a symmetric encryption algorithm (e.g. Blowfish), or an international data encryption algorithm (IDEA) to produce the composite code according to the certification data and the verification code. However, the disclosure is not limited to the above coding method utilized by the combining module, and all those having ordinary skill in the art can freely use other suitable encryption and/or coding methods to produce a composite code.

The verification module 230 is configured to determine whether the composite code matches the certification data and the verification code. When the composite code matches the certification data and the verification code, the verification module 230 considers that the authentication of the e-ticket is successful or the e-ticket is valid. In an embodiment of the disclosure, the verification module 230 may further determine whether a user profile matches a whitelisting of valid certification data. When the composite code matches the certification data and the verification code and the user profile matches the whitelisting of valid certification data, the e-ticket is considered to successfully be authenticated.

Figure 2:
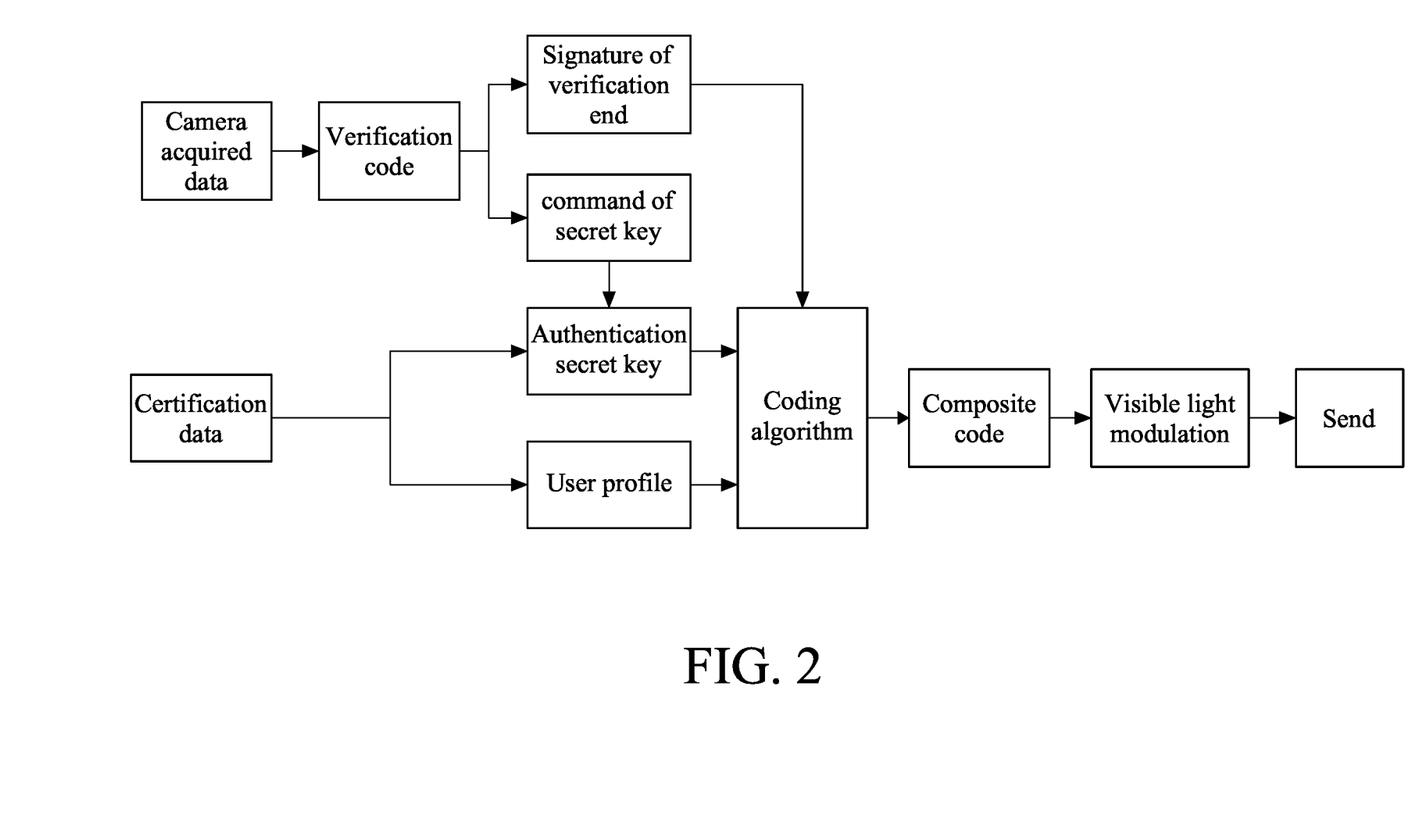
FIG. 2 is a schematic view of the operational process of a user end in an embodiment of the disclosure.

In the embodiment shown in FIG. 2, the foregoing certification data includes a user profile and a plurality of secret keys in an example. In some embodiments, the user profile is not limited to include an ID, age, gender, address, etc. All those having ordinary skill in the art can freely incorporate suitable attributes in a user profile. The aforementioned verification code from a camera acquired data includes a command of secret key authorized by an issuer and a signature of verification end in an example. The combining module 130 is able to further obtain an authentication secret key, which is indicated by the command of secret key authorized by the issuer of the verification code, among a plurality of secret keys. In an embodiment of the disclosure, the combining module 130 encodes the signature of verification end, the authentication secret key and the user profile together to produce a composite code by orderly inserting a plurality of characters of the user profile at a plurality of positions within the signature of verification end according to a plurality of elements in the acquired visible light verification code.

In the above embodiments, coding and encryption are carried out by the authentication secret key indicated by the command of secret key, the signature of verification end, and the user profile. However, in another embodiment of the disclosure, encryption may be carried out by one or more encryption algorithms selected from an encryption algorithm list according to the command of secret key. For example, when a command of secret key is a private Key, the selected encryption algorithm would be a symmetric encryption algorithm; and when the command of secret key is a public key, the selected encryption algorithm would be an asymmetric encryption algorithm. In other embodiments, the encryption algorithm may be other types of coding or combination methods, and the disclosure does not intend to limit it.

Figure 3:
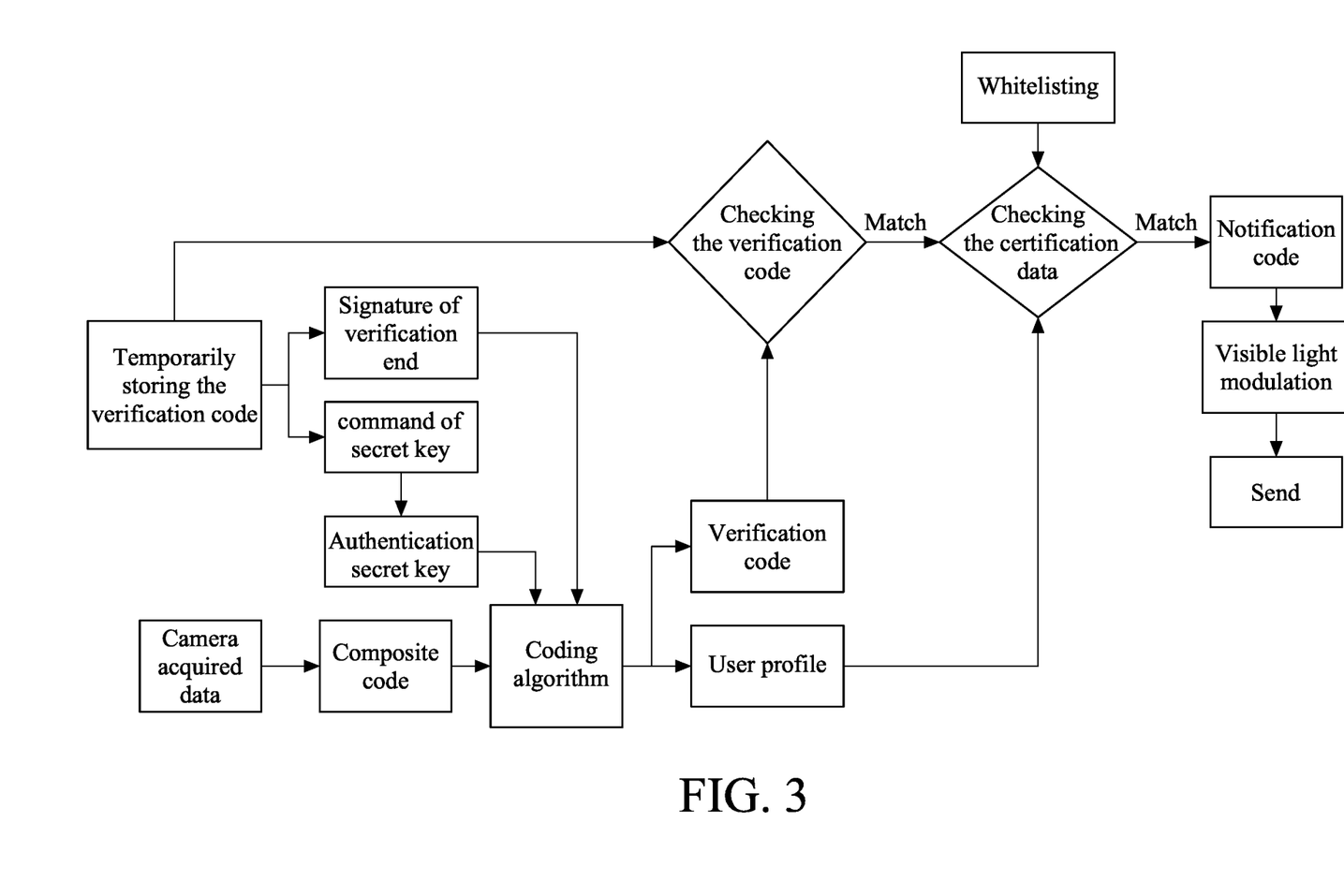
FIG. 3 is a schematic view of the operational process of a verification end in an embodiment of the disclosure.

In the embodiment shown in FIG. 3, the verification module 230 further decomposes the composite code from a camera acquired data to produce a decomposition result, and determines whether the decomposition result matches the verification code and the certification data. When the decomposition result matches the verification code and the certification data, the e-ticket is considered to successfully be authenticated. In an embodiment of the disclosure, the verification module 230 may further obtain an authentication secret key, which is indicated, according to a command of secret key of the verification code temporarily stored in a storage unit, and in reverse order takes out the signature of verification end, the authentication secret key and the user profile from the composite code. The above embodiments are merely for exemplary descriptions, and the disclosure is not limited to these embodiments.

In an embodiment of the disclosure, the verification module 230 may further determine whether a character string constituted by a plurality of decomposed characters related to a user profile matches a user profile of the whitelisting of valid certification data, and determine whether a remaining character string, a signature of verification end and an authorization password match a signature of verification end and an authorization password in the verification code temporarily stored in the storage unit. When a user profile formed by the character string constituted by the decomposed characters matches the user profile of the whitelisting of valid certification data, and the remaining character string, the signature of verification end and the authorization password match the signature of verification end and the authorization password in the verification code temporarily stored in the storage unit, the verification module 230 considers that the e-ticket is successfully authenticated. For example, in the second stage of the decomposition process, the character string constituted by the decomposed characters forms a user profile, so the verification module 230 considers that this user profile matches the user profile of the certification data, after comparing it with the whitelisting. In the first stage of decomposition process, a character string constituted by the decomposed characters forms a verification code, so the verification module 230 considers that this verification code matches the signature of verification end and the authorization password in the verification code temporarily stored, after comparing it with the verification code temporarily stored in the storage unit.

In an embodiment of the disclosure, after the verification module 230 considers that the e-ticket is authenticated, the verification module 230 is able to send a notification code to the first data acquiring module 120 via the second output module 210, and the visible light notification code indicates successful authentication. However, sending a visible light notification code is optional, and the disclosure does not intend to limit it.

In another embodiment of the disclosure, the verification module 230 verifies a composite code by other methods. For example, the verification module 230 produces another composite code according to the certificate and the aforementioned verification code by itself, and determines whether the e-ticket is successfully authenticated, by comparing the received composite code with another composite code produced by itself.

Figure 4:
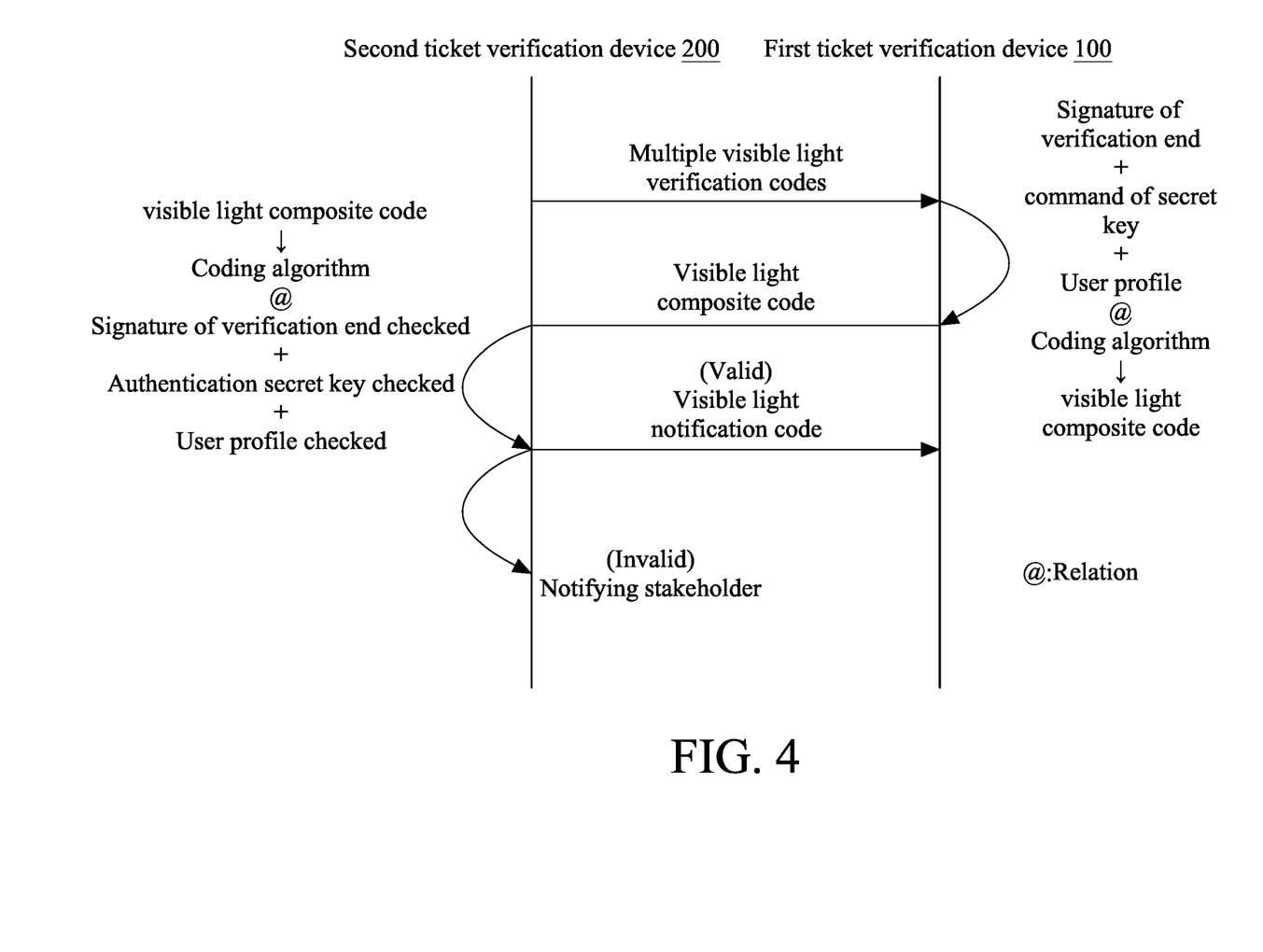
FIG. 4 is a schematic view of the verification process in an embodiment of the disclosure.

FIG. 4 is a schematic view of the verification process in an embodiment of the disclosure. When a user end would like to request for the authentication of an e-ticket, the user can outputs the e-ticket via the first ticket authentication device 100. Accordingly, when the second ticket authentication device 200 senses the output of the first ticket authentication device 100, the second ticket authentication device 200 acquires the e-ticket and outputs a plurality of visible light verification codes.

For example, after the first ticket authentication device 100 acquires the visible light verification codes, the first ticket authentication device 100 obtains an authentication secret key, which is indicated, from a plurality of secret keys according to a command of secret key authorized by an issuer of the verification code, and then encodes a signature of verification end, the authentication secret key and a user profile to produce a composite code, and then outputs the visible light composite code. After the second ticket authentication device 200 acquires the visible light composite code, the second ticket authentication device 200 decomposes the composite code to produce a decomposition result (including the signature of verification end, the authentication secret key and the user profile), and then determines whether the decomposition result matches the certification data and the verification code.

The second ticket authentication device 200 outputs a plurality of visible light verification codes before receiving the visible light composite code, and thus, the authentication will be considered to be successful if the following decomposition result matches either the certification data or the verification code. For example, when a user profile formed by a character string constituted by the decomposed characters matches a certification data in the whitelisting and a signature of verification end and an authorization password in the remaining character string match a signature of verification end and an authentication secret key of the verification code temporarily stored in the storage unit, the second ticket authentication device 200 considers that the authentication of the e-ticket is successful, and sends a visible light notification code, as shown in FIG. 4. Accordingly, when a user profile formed by a character string constituted by the decomposed characters does not match a certification data in the whitelisting, or when a plurality of elements in a verification code formed by the remaining character string does not match a signature of verification end and an authentication secret key temporarily stored in the storage unit, the authentication of the e-ticket fails. Therefore, the first ticket authentication device 100 and the second ticket authentication device 200 can interact with each other for the authentication of e-ticket. In this way, the disclosure may avoid the hacking and data theft of Trojan horse programs.

Figure 5:
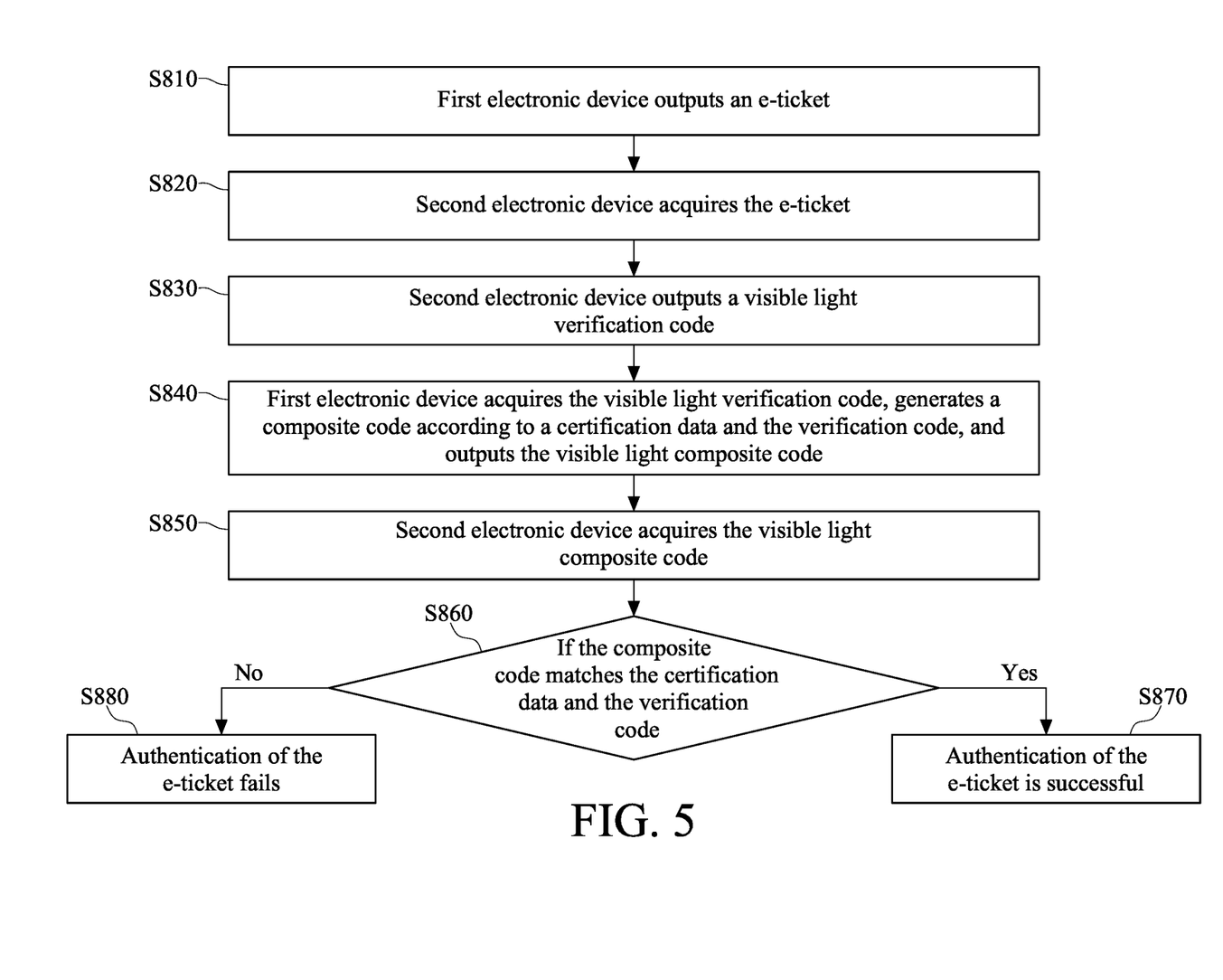
FIG. 5 is a flow chart of a ticket authentication method in an embodiment of the disclosure.

FIG. 5 is a flow chart of a ticket authentication method in an embodiment of the disclosure. As shown in FIG. 5, the ticket authentication method in the embodiment of the disclosure includes steps S810~S880. In the following description, it is presumed that the first electronic device is the foregoing first ticket authentication device 100 and the second electronic device is the foregoing second ticket authentication device 200.

In step S810, the first electronic device outputs an e-ticket.

In step S820, the second electronic device acquires the e-ticket.

In step S830, the second electronic device outputs a visible light verification code.

In step S840, the first electronic device acquires the visible light verification code, produces a composite code according to a certification data and the verification code, and outputs the visible light composite code.

In step S850, the second electronic device acquires the visible light composite code.

In step S860, the second electronic device determines whether the composite code matches the certification data and the verification code.

In step S870, when the composite code matches the certification data and the verification code, the second electronic device determines that the authentication of the e-ticket is successful.

In step S880, when the composite code does not match the certification data and the verification code, the second electronic device determines that the authentication of the e-ticket fails.

The details of the above steps S810~S880 have been described in the aforementioned embodiments and thus, will not be described again hereafter.

According to the aforementioned embodiments of the disclosure, a first electronic device of a user end is used to output an e-ticket and a corresponding certification data and a second electronic device of a verification end is used to output a visible light verification code, so that the first electronic device produces a visible light composite code according to the certification data and the verification code and sends it to the second electronic device for verification. Accordingly, the second electronic device decomposes the composite code to produce a decomposition result and determines whether the decomposition result matches the certification data and the verification code. If yes, the second electronic device considers that the e-ticket is successfully authenticated; but if not, the second electronic device considers that the authentication of the e-ticket fails. In this way, the authentication of an e-ticket can be carried out by the interaction between the first electronic device and the second electronic device. Therefore, the hacking and data theft of Trojan horse programs may be avoided, leading to higher security in verification. Moreover, the use of certification data and verification codes in off-line write-off may reduce the cost of disposing hardware and enhance the immediateness of authentication.

What is claimed is:

1. A ticket authentication method, comprising:
by a first communication module of a first electronic device, receiving an e-ticket and a certification data corresponding to the e-ticket from a ticket issuing platform;
by a second communication module of a second electronic device, receiving the certification data from a verification platform;
outputting the e-ticket by a screen of the first electronic device;
acquiring the e-ticket by a photographing component of the second electronic device;
by a light emitting component of the second electronic device, outputting a verification code to the first electronic device, wherein the verification code is a visible light verification code and corresponds to the certification data;
temporarily storing the verification code in the second electronic device after outputting the verification code;
by a photographing component of the first electronic device, acquiring the verification code; by a combining module of the first electronic device, producing a composite code according to the certification data and the verification code, wherein the certification data comprises a user profile and secret keys, the verification code comprises a signature of verification end and a command of secret key authorized by an issuer, and producing the composite code according to the certification data and the verification code comprises:
acquiring an authentication secret key which is indicated, from the secret keys according to the command of secret key authorized by the first electronic device; and
inserting a plurality of characters of the user profile at a plurality of positions within the signature of verification end in sequence to produce the composite code according to a plurality of elements in the acquired visible light verification code;
by a light emitting component of the first electronic device, outputting the composite code to the second electronic device;
by the photographing component of the second electronic device, acquiring the composite code;
by a verification module of the second electronic device, determining whether the composite code matches the certification data and the verification code; and
by the second electronic device, considering that authentication of the e-ticket is successful when the composite code matches the certification data and the verification code.

2. The ticket authentication method according to claim 1, wherein acquiring the composite code and determining whether the composite code matches the certification data and the verification code by the second electronic device comprises:
by the second electronic device, decomposing the composite code to produce a decomposition result; and by the second electronic device, determining whether the decomposition result matches the certification data and the verification code.

3. The ticket authentication method according to claim 2, wherein decomposing the composite code to produce the decomposition result comprises:
by the second electronic device, acquiring the authentication secret key, according to the command of secret key of the verification code temporarily stored in a storage unit; and
in reverse order taking out the signature of verification end, the authentication secret key and the user profile from the composite code.

4. The ticket authentication method according to claim 3, wherein determining whether the decomposition result matches the certification data and the verification code by the second electronic device comprises:
by the second electronic device determining whether a character string constituted by decomposed characters matches the user profile of a whitelisting of valid certification data; and
by the second electronic device determining whether a remaining character string matches the signature of verification end and an authorization password in the verification code temporarily stored in the storage unit.

5. The ticket authentication method according to claim 4, wherein determining that the authentication of the e-ticket is successful when the composite code matches the certification data and the verification code, comprises:
by the second electronic device determining that the authentication of the e-ticket is successful when a user profile formed by the character string constituted by the decomposed characters matches a whitelisting of valid certification data, and a signature of verification end and an authorization password related to the remaining character string match a plurality of elements in the verification code temporarily stored by the storage unit.

6. The ticket authentication method according to claim 1, wherein before the e-ticket and the certification data are outputted by the first electronic device, the ticket authentication method further comprises:
by a ticket issuing platform transmitting the e-ticket and the certification data to the first electronic device;
wherein the e-ticket corresponds to a purchase request transmitted from the first electronic device to the ticket issuing platform.

7. A ticket authentication device, applied to a user end, and the ticket authentication device comprising:
an output module for outputting an e-ticket to a verification end by visible light communication;
an acquiring module coupled to the output module, for acquiring a visible light verification code corresponding to a certification data corresponding to the e-ticket to obtain a verification code from the visible light verification code, wherein the visible light verification code is outputted by the verification end, the certification data comprises a user profile and a plurality of secret keys, and the verification code comprises a signature of verification end and a command of secret key authorized by an issuer; and
a combining module coupled to the output module and the acquiring module, wherein the combining module further acquires an authentication secret key from the plurality of secret keys according to the command of secret key, and produces the composite code by inserting a plurality of characters of the user profile at a plurality of positions within the signature of verification end according to a plurality of elements in the acquired visible light verification code, the output module outputs the composite code to the verification end by visible light communication.

8. The ticket authentication device according to claim 7, wherein the output module is a screen.

9. The ticket authentication device according to claim 7, wherein the acquiring module is a photographing component.

10. The ticket authentication device according to claim 7, further comprising:
a communication module coupled to the acquiring module, for transmitting a purchase request to a ticket issuing platform, and receiving the e-ticket and the certification data from the ticket issuing platform.

11. A ticket authentication method applied to a user end, and the ticket authentication method comprising:
outputting an e-ticket a verification end by visible light communication;
acquiring a visible light verification code corresponding to a certification data corresponding to the e-ticket to obtain a verification code from the visible light verification code, wherein the visible light verification code is outputted by the verification end; and
producing a composite code according to the certification data and the verification code and outputting the composite code to the verification end by visible light communication;
wherein the certification data comprises a user profile and a plurality of secret keys, the verification code comprises a signature of verification end and a command of secret key authorized by an issuer, and producing the composite code according to the certification data and the verification code and outputting the composite code comprises:
acquiring an authentication secret key from the plurality of secret keys according to the command of secret key; and
producing the composite code by inserting a plurality of characters of the user profile at a plurality of positions within the signature of verification end according to a plurality of elements in the acquired visible light verification code.

12. The ticket authentication method according to claim 11, further comprising:
transmitting a purchase request to a ticket issuing platform; and
receiving the e-ticket and the certification data from the ticket issuing platform.

13. A ticket authentication device applied to a verification end, and the ticket authentication device comprising:
an output module for outputting a plurality of verification codes to a user end by visible light communication;
a storage unit for temporarily storing the plurality of verification codes;
an acquiring module for acquiring an e-ticket and a visible light composite code that is produced according to a certification data corresponding to the e-ticket and the verification code and to obtain a composite code from the visible light composite code, wherein the visible light composite code is outputted by the user end; and
a verification module coupled to the output module and the acquiring module, for determining whether the composite code matches the certification data and the verification code, and the verification module determining that authentication of the e-ticket is successful when the composite code matches the certification data and the verification code.

14. The ticket authentication device according to claim 13, wherein the verification module further decomposes the composite code to produce a decomposition result, and determines whether the decomposition result matches the certification data and the verification code, and when the decomposition result matches the certification data and the verification code, the verification module determines that the authentication of the e-ticket is successful.

15. The ticket authentication device according to claim 14, wherein the certification data comprises a user profile and an authentication secret key, the verification code comprises a signature of verification end and a command of secret key authorized by an issuer, and the verification module further acquires an authentication secret key, which is indicated, according to the command of secret key of the verification code temporarily stored in a storage unit, and the verification module takes out the signature of verification end, the authentication secret key and the user profile from the composite code.

16. The ticket authentication device according to claim 15, wherein the verification module further determines whether a character string constituted by decomposed characters matches the user profile of a whitelisting of valid certification data, determines whether a remaining character string matches the signature of verification end and an authorization password in the verification code temporarily stored in the storage unit, and when the user profile formed by the character string constituted by the decomposed characters matches the whitelisting of valid certification data and the remaining character string matches the signature of verification end and the authorization password in the verification code temporarily stored in the storage unit, the verification module determines that authentication of the e-ticket is successful.

17. The ticket authentication device according to claim 13, wherein the output module is a light emitting component.

18. The ticket authentication device according to claim 13, wherein the acquiring module is a photographing component.

19. A ticket authentication method applied to a verification end, and the ticket authentication method comprising:
outputting a verification code to a user end by visible light communication;
acquiring an e-ticket, a visible light composite code, and a certification data corresponding to the e-ticket from the user end;
obtaining a composite code from the visible light composite code;
determining whether the composite code matches the certification data and the verification code; and
determining that authentication of the e-ticket is successful when the composite code matches the certification data and the verification code.

20. The ticket authentication method according to claim 19, wherein determining whether the composite code matches the certification data and the verification code comprises:
decomposing the composite code to produce a decomposition result; and
determining whether the decomposition result matches the certification data and the verification code.

21. The ticket authentication method according to claim 20, wherein decomposing the composite code to produce the decomposition result comprises:
obtaining an authentication secret key, which is indicated, from a command of secret key of the verification code temporarily stored in a storage unit; and
in reverse order taking out the signature of verification end, the authentication secret key and a user profile.

22. The ticket authentication method according to claim 21, wherein determining whether the decomposition result matches the certification data and the verification code comprises:
determining whether a user profile formed by a character string constituted by decomposed characters matches a whitelisting of valid certification data; and
determining whether a remaining character string matches the signature of verification end and an authorization password in the verification code temporarily stored in the storage unit.

23. The ticket authentication method according to claim 22, wherein determining that the authentication of the e-ticket is successful when the composite code matches the certification data and the verification code, comprises:
determining that the authentication of the e-ticket is successful when the character string constituted by the decomposed characters matches the user profile, the remaining character string matches the signature of verification end and the authorization password.

* * * * *